United States Patent [19]

Grundy

[11] Patent Number: 4,738,700
[45] Date of Patent: Apr. 19, 1988

[54] METHOD AND APPARATUS FOR CONTROLLING TEMPERATURE IN A FIBER GLASS FORMING BUSHING

[75] Inventor: Reed H. Grundy, Murrysville, Pa.

[73] Assignee: PPG Industries, Inc., Pittsburgh, Pa.

[21] Appl. No.: 941,236

[22] Filed: Dec. 12, 1986

[51] Int. Cl.[4] .................. C03B 37/07; C03B 37/09
[52] U.S. Cl. ............................................. 65/1; 65/2; 65/162; 65/DIG. 4; 219/494; 219/504; 373/29; 373/40; 373/136
[58] Field of Search .............. 65/1, 2, 162, DIG. 4; 219/494, 504; 373/29, 40, 136

[56] References Cited

U.S. PATENT DOCUMENTS

| | | | |
|---|---|---|---|
| 4,256,477 | 3/1981 | Moody | 65/162 X |
| 4,285,712 | 8/1981 | Thompson | 65/2 |
| 4,546,485 | 10/1985 | Griffiths et al. | |
| 4,594,087 | 6/1986 | Kuhn | |

*Primary Examiner*—Arthur D. Kellogg
*Attorney, Agent, or Firm*—John E. Curley

[57] ABSTRACT

An apparatus for more accurately measuring the temperature of a fiber glass forming bushing is described which includes the placing of sidewall and bottom thermocouples in locations on the bushing so that electrical signals representing noise are eliminated or reduced significantly.

7 Claims, 4 Drawing Sheets

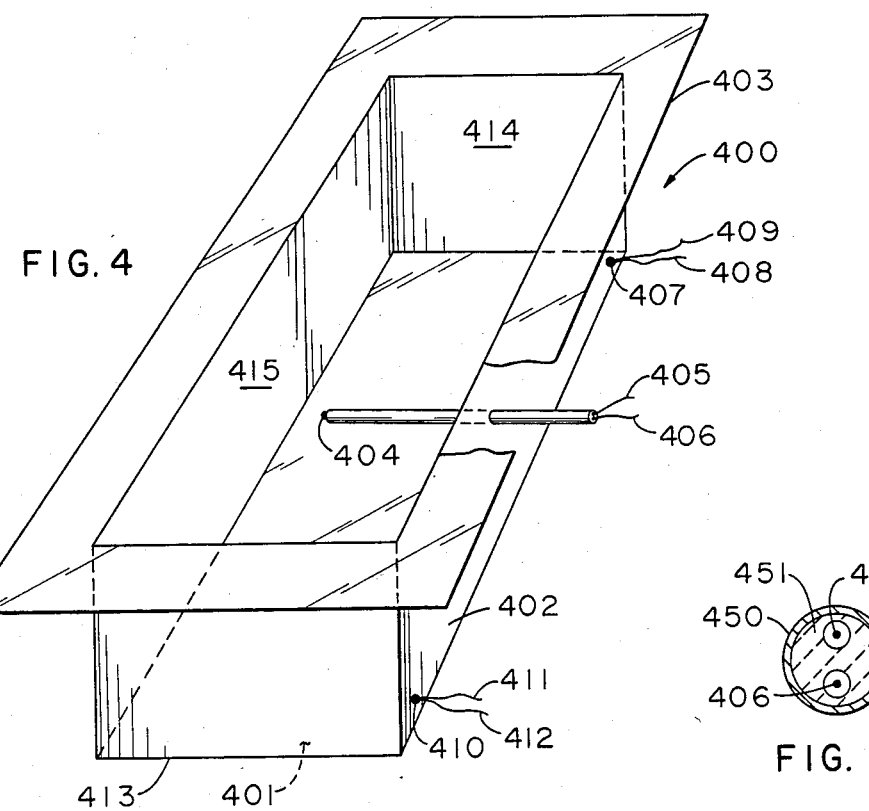
FIG. 4
FIG. 6
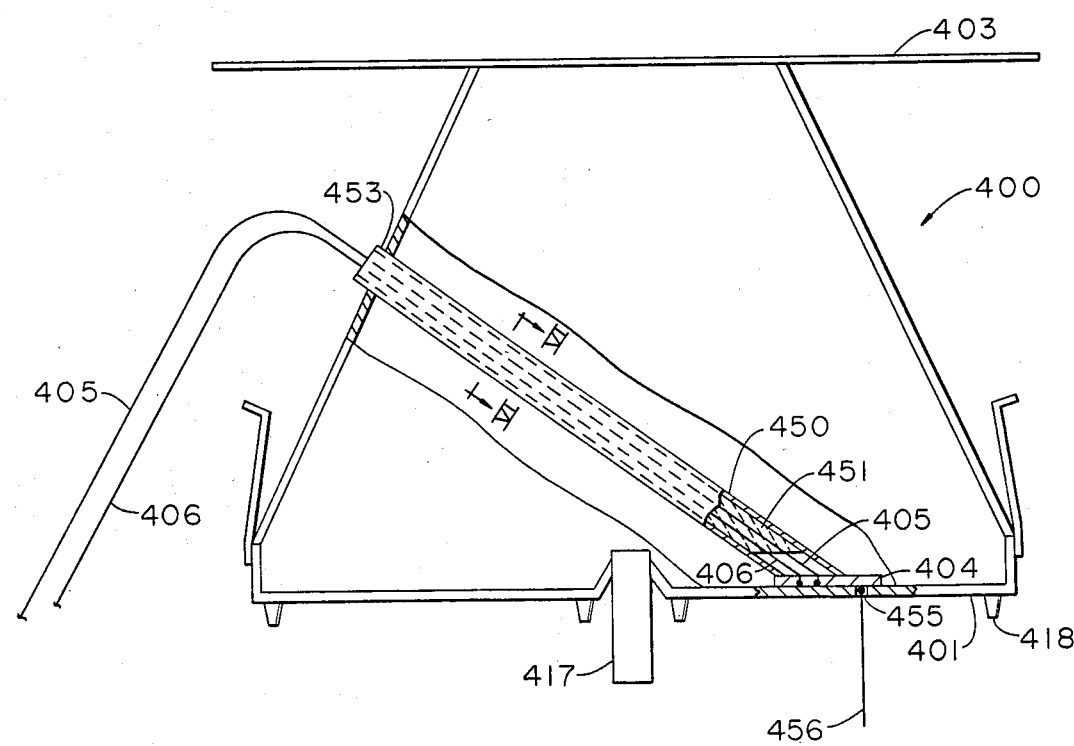
FIG. 5

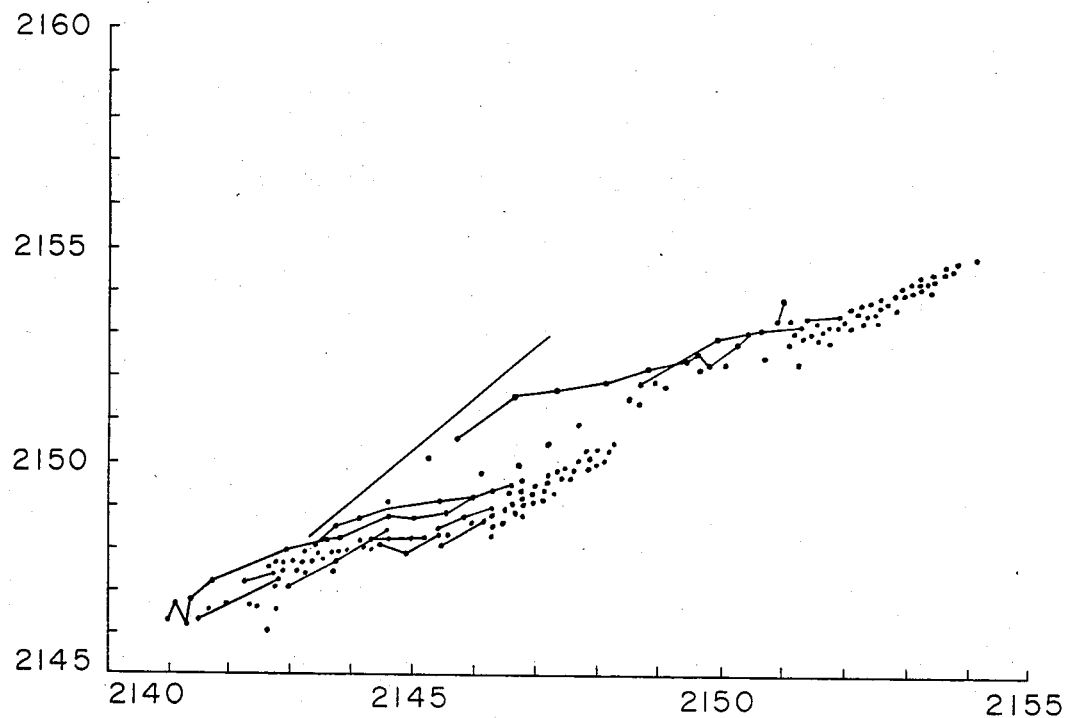
FIG.7 – PRIOR ART
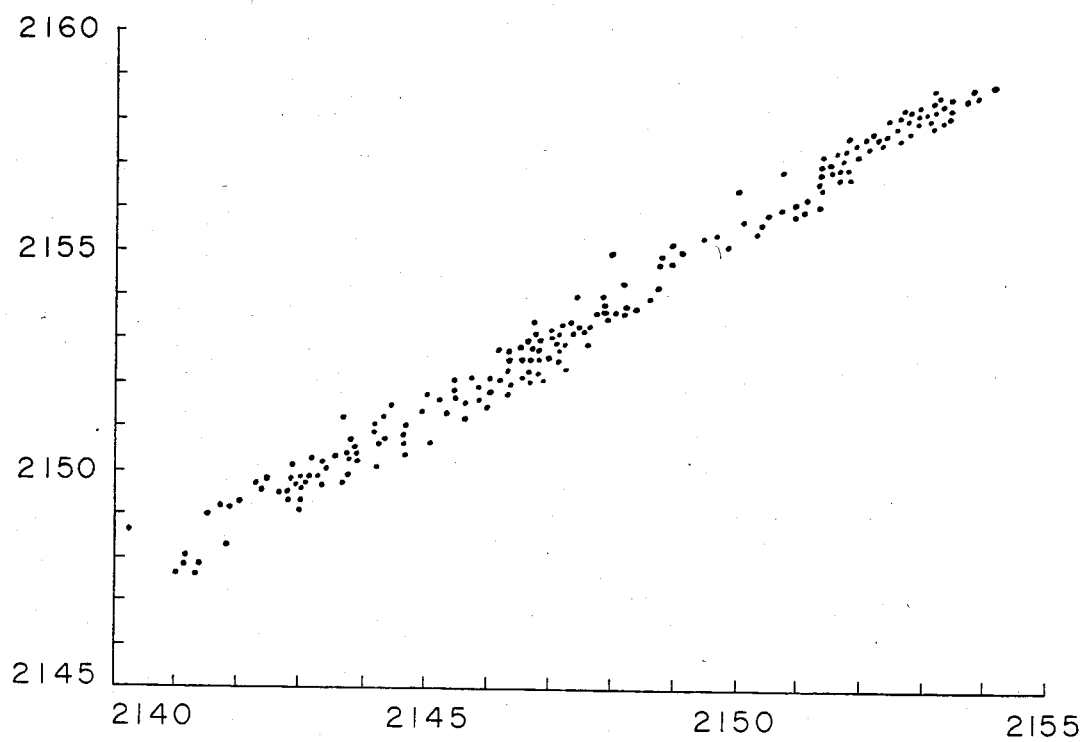
FIG.8 – INVENTION

METHOD AND APPARATUS FOR CONTROLLING TEMPERATURE IN A FIBER GLASS FORMING BUSHING

The present invention relates to the method of controlling the temperature of a Joule heating element. More particularly, the present invention involves a method and apparatus for controlling the temperature of a fiber glass bushing which has an electrical control responsive to thermocouple generated signals. Still more particularly, the present invention relates to methods and apparatus for controlling fiber glass bushings involving a weighting scheme for thermocouple measurements taken therein to generate signals for feed to an electrical control system for such bushings.

BACKGROUND OF THE INVENTION

It is common practice in the fiber glass industry today to control the bushings in which molten glass is contained and through which glass fiber formation occurs and to control the bushing which is essentially a heating element by utilizing electrical control devices. Thus, in U.S. Pat. Nos. 4,546,485 and 4,594,087, two systems are described which generally speaking conform to systems currently in use today for producing fiber glass from fiber glass bushings.

In the formation of glass fibers from a bushing, the bushing goes through an operational cycle which involves starting up the bushing, running the bushing, doffing the product wound from the bushing and restarting the bushing. What this means in real terms is that the bushing is subjected to many changes in its thermal history over each running cycle.

A bushing for producing glass fibers is typically constructed of non-reactive refractory metal such as platinum, platinum-rhodium alloy being the preferred metal. The bottom of the bushing is typically divided into a plurality of rows of orifices through which molten glass can readily flow. The orifices usually have on the bottom side of them an associated orifice tip in communication with the orifice so that the molten glass passing through the orifices flows through the tips. Fibers are formed as the molten glass flowing from the tips to the atmosphere is cooled. Fibers formed from the bushing are typically gathered into one or more strands and are attenuated by connecting the strand or strands to the surface of a rotating winder which rotates at sufficient revolutions per minute to pull the strands at linear speeds of 3,000 to 20,000 feet per minute or more.

In operating a glass fiber forming bushing, therefore, molten glass is permitted to flow by Poiseuille's Law through the orifices in the bottom of the bushing. The resulting streams of molten glass are cooled to form filaments as they leave the bushing bottom. Cooling is accomplished by water sprays and environmental air. The fibers or filaments are gathered into one or more strands, usually by placing the filaments as they emerge from the bushing tips into a grooved graphite gathering shoe. The resulting strand or strands are then wound around the surface of the winder and the winder is rotated. Thus the strands are drawn from the bushing by being wound on the winder as it begins to rotate. The winder increases in speed until it reaches the desired speed that will produce a filament of a given diameter based on the diameter of the orifices in the bushing through which the glass is drawn. Another parameter that controls the diameter of the filaments as they leave the orifices is the viscosity of the glass and that is determined by the temperature of the bushing and the glass composition. Since molten glass is continuously maintained in and passed through the bushing during fiber formation, the bushing is fed molten glass through an opening in a forehearth connected to a glass melting furnace.

In the starting up and stopping operation of a bushing, many transient effects occur. Thus, during start up, the initial strands wound on the winder surface are being wound at an accelerating speed which starts out from zero and gradually works its self up to the rotational speed necessary to produce a given filament size. This running of strand at high speed draws environmental air into the filament forming zone and then downwardly at considerable velocity. A bushing then runs for a significant period of time, usually 10 to 30 minutes or longer and the filaments being formed are wound in strand form on the surface of the winder at the desired filament diameter. When the desired weight of material has been accummulated on the surface of the winder the winder is then shut down. This shut down involves a deceleration of the rotation of the winder and a reduction in strand speed. Air flows around the bushing change rapidly as a result and the loss of cooling by the high velocity air present during running results in increasing bushing temperatures if all things remain the same except the winder shut down.

As has been previously pointed out, the bushings are controlled by a temperature controller which feeds a signal corresponding to the desired set point for that bushing to the power pack that supplies the bushing current. Thus, for a given viscosity of glass desired from a bushing, it might require for example, a bushing temperature of 2200° F. In such an instance, it is desirable for that bushing to be forced to operate at 2200° F. so that the proper glass viscosity is maintained by the bushing. This, coupled with a control of the rotational speed of the winder through its motor controls accurately and efficiently the filament diameter.

To insure that the controller is operating a bushing at its desired temperature, thermocouples are placed in the sides of the bushing near the bottom. The readings from the thermocouples are then averaged and the resulting signal is sent to the power pack controller feeding current to the bushing. The thermocouples usually are located slightly inboard of the ends of the bushing and close to the bottom on the front wall, i.e., the wall closest to the operator. The thermocouple measurements taken are then passed through a temperature averaging device such as shown in U.S. Pat. No. 4,546,485 to determine the bushing bottom or faceplate temperature. As used herein, the terms faceplate, tipplate and bottom are synonymous. The signal resulting from this average temperature determination is then passed to the controller and the controller forces the bushing to adjust itself to the set point temperature based on the reading it obtains.

It has been found that while bushing controllers can to some degree control the bushing with a certain amount of accuracy, several serious defects are prevalent in this system. First, by taking bushing measurements from the sides of the bushings, close to the bottom at two locations, the effects of noise can be as high as 12% of the temperature signal read, therefore, the signal is inaccurate at least to that degree, i.e., only 88 percent of the signal represents true temperature. The other 12 percent measured is caused by changing environmental effects and inappropriate thermocouple placement. It has also been found that during the start up, running and doffing of the forming packages that the temperature of the bushings varies over a very wide range and quite rapidly. Despite the accuracy of the thermocouples measuring the temperature of the tip plate, the signals that are generated thereby and fed to the controller contain false signals, i.e., noise. Thus, the effects of things such as environmental air changes occurring near the tip plate, movement of the strands from the gathering shoes to pull rolls during doffing, and other similar occurrences cause rapid temperature changes which give rise to tip plate measurements that are not a true indication of the thermal condition of the tip plate. While the controller tries to keep the temperature of the bushing constant based on the thermocouple readings, it has been found that these signals are not always representative of the tip plate temperature and therefore, a need for more accurate determination exists.

SUMMARY OF THE INVENTION

In accordance with the instant invention, a method and apparatus are described for measuring temperature in a Joule heating element which has an electrical control system connected thereto responsive to signals generated by temperatures measured on the heating element. Both the apparatus and the method measure the temperatures of the heating element in at least one location to provide a signal representative of the temperature of the heating element over a given surface area. The heating element temperature is then measured at a second location so positioned that when that temperature is averaged with the measurement of the first temperature, an average temperature of the heating element is obtained with the noise effect of the measured temperature of the first location being reduced to less than 6% of the measured temperatures. Preferably, the temperature of the heating element is measured in at least two locations to provide a signal representative of the temperature of the heating element over a given surface area and a third location is used to provide a further temperature reading which when averaged with the first two, eliminates or reduces the noise effect to less than 6%. By averaging the three signals therefore in the preferred embodiment, a signal is provided from the averaged thermocouple temperatures that produces a signal to the controller which is closer to the real temperature of the heating element than heretofore obtained using the conventional equipment used by the skilled artisan. Thus, a more accurate characterization of what is actually going on on the surface of the heating element at any given point in time, whether it be start up, running or doffing, is now readily obtainable and in a form such that it can be used to control the heating element more precisely.

The object of the invention is therefore to provide a simple, effective method for accurately measuring the temperatures of a Joule heating element and in particular the bottom or faceplate of a fiber glass forming bushing.

It is a further object of the invention to measure temperatures of a fiber glass bushing bottom or orifice plate in at least 3 locations on a bushing, one of the locations being on the bottom of the bushing to thereby provide an accurate determination of the average temperature of the bushing faceplate or bottom.

Still a further object of the instant invention is to provide thermocouple measurements in a bushing in such a manner that the measurements are truly representative of the temperature of the bushing orifice plate and minimize the effect of noise from transients.

A still further object of the instant invention is to provide a temperature measuring system for a fiber glass bushing such that bushing temperatures can be measured effectively from the bottom of the bushing.

Another object of the invention is to provide a novel apparatus for averaging thermocouple readings taken on a fiber glass bushing orifice plate as well as from the sides.

These and other objects of the instant invention will become apparent to those skilled in the art from the ensuring description and illustrative embodiments.

BRIEF DESCRIPTION OF THE DRAWINGS

For a more complete understanding of the present invention, reference is made to the accompanying drawings in which:

FIG. 4 is a diagrammatic illustration of a second and preferred embodiment of the instant invention showing the placement of the bottom thermocouple resting on the bushing orifice plate.

FIG. 5 is an end view of the embodiment of FIG. 4 showing the thermocouple attached to the bushing faceplate.

FIG. 6 is a cross section of the plate 405 of FIG. 4.

FIG. 7 is a a plot of tip plate temperatures versus the set point temperature of a temperature controller used to control the bushing.

FIG. 8 is a plot of tip plate temperatures measured by the instant invention versus the set point temperature of a temperature controller used to control a bushing.

DETAILED DESCRIPTION OF THE DRAWINGS

Figure 1:
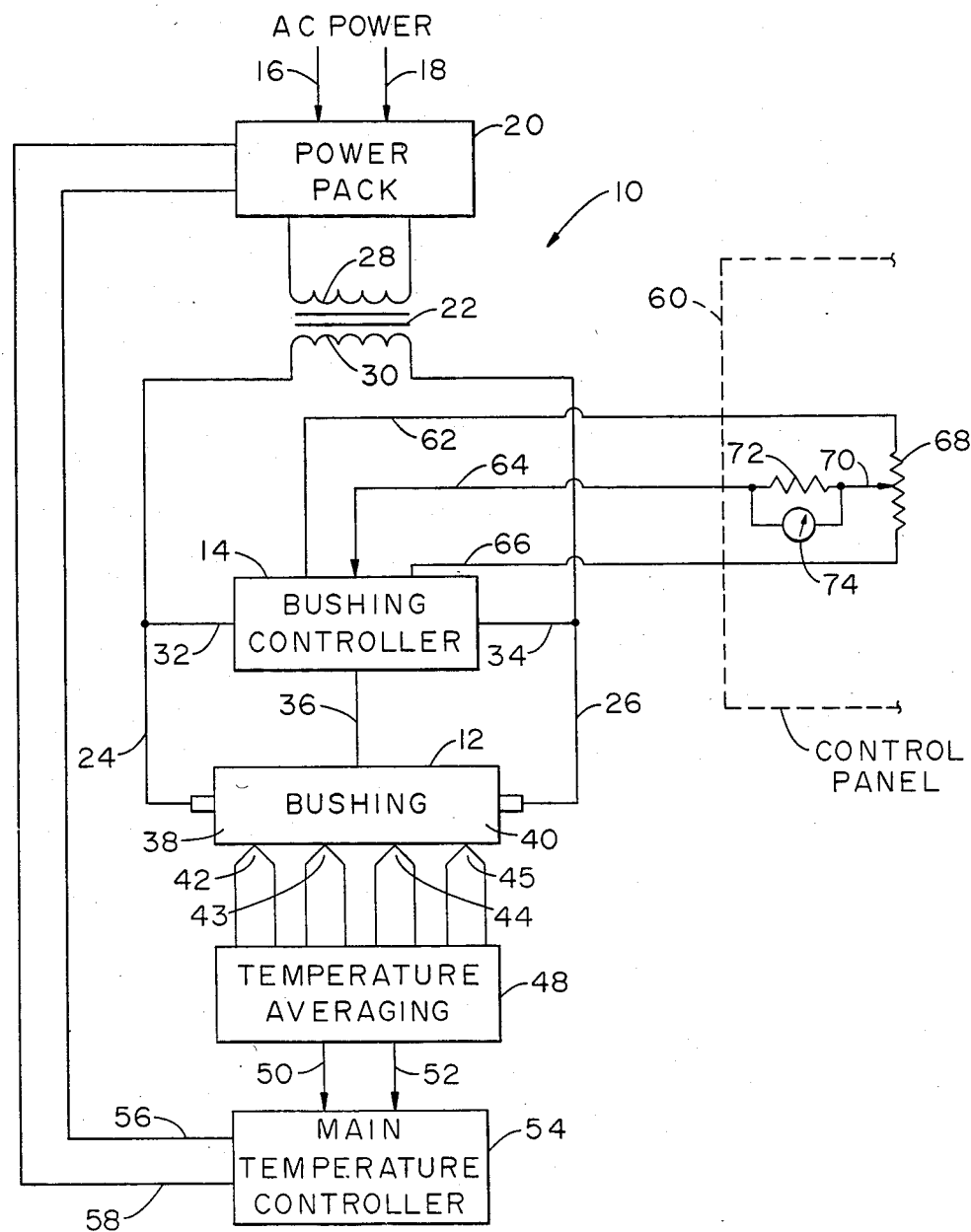
FIG. 1 is a schematic block diagram of a fiber glass bushing electrical heating system with its associated bushing and temperature controllers.

Turning to the drawings and FIG. 1 in particular, there is shown a power pack 20 having the AC lines 16 and 18 delivering current thereto. The power pack supplies AC power to the primary winding 28 of transformer 22, the secondary winding 30 of which is connected via lines 24 and 26 to a fiber glass bushing 12. Bushing 12 has connected across lines 24 and 26, in parallel with it, a bushing controller 14 which is operatively connected through lead lines 62, 64 and 66 to a control panel 60 in which is located a circuit which can be utilized to adjust electrical input to the bushing controller 14. The bushing 12 has a series of thermocouples 42, 43, 44 and 45 connected thereto at the sides thereof and near the bottom of the bushing 12. These thermocouples gather temperature information from the bushing 12 and passes that information to a temperature averaging device 48 which averages the temperatures measured by the thermocouples 42, 43, and 44 and 45. The average temperature is then converted to signals which are passed through lines 50 and 52 to a temperature controller 54 which then, through lead lines 56 and 58, passes those signals to power pack 20 to thereby regulate the current being passed to the transformer 22. The temperature measurements taken by thermocouples 42, 43, 44 and 45 are representative of the average temperature of a specific area of the orifice plate of the bushing 12. In recording these temperatures and producing signals in response thereto, it has been found that the bushing temperatures represented when taken at the sides near the bottom of the bushing result in not only a transmission of a signal representing the temperature measured in a given area of the bushing orifice plate but also the noise associated with those temperature readings. The average temperature arrived at in the temperature averaging device 48 therefore is an average temperature of not only the bushing orifice temperature but also the noise associated therewith. Experience has shown that this noise level can represent as much as 12% of signals generated by the thermocouples. Therefore, the signals being transmitted via lines 50 and 52 to the main temperature controller are inaccurate to the extent that they represent at least 12% noise utilizing a system such as described in U.S. Pat. No. 4,594,087. As will be appreciated, the control response to the bushing controller caused by variations in the power pack input generated by the main temperature controller 54 are consequently frequently inaccurate, especially during transient periods such as the start up of a bushing or the doffing of a forming package.

Figure 2:
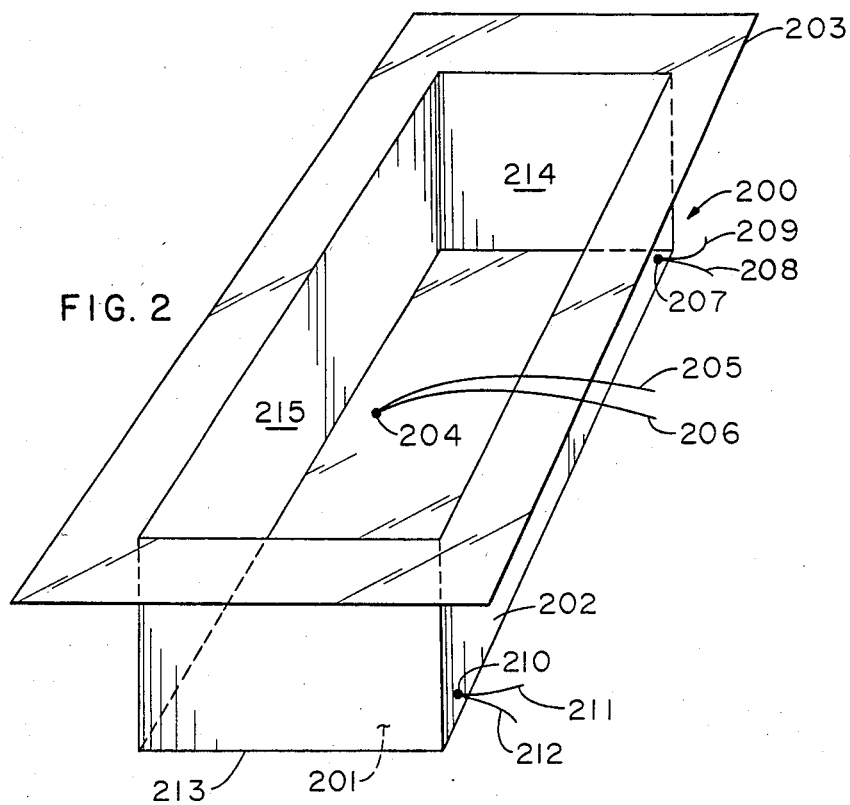
FIG. 2 is a diagrammatic illustration, in perspective, of one embodiment of the invention showing the placement of three thermocouples on a bushing.
Figure 3:
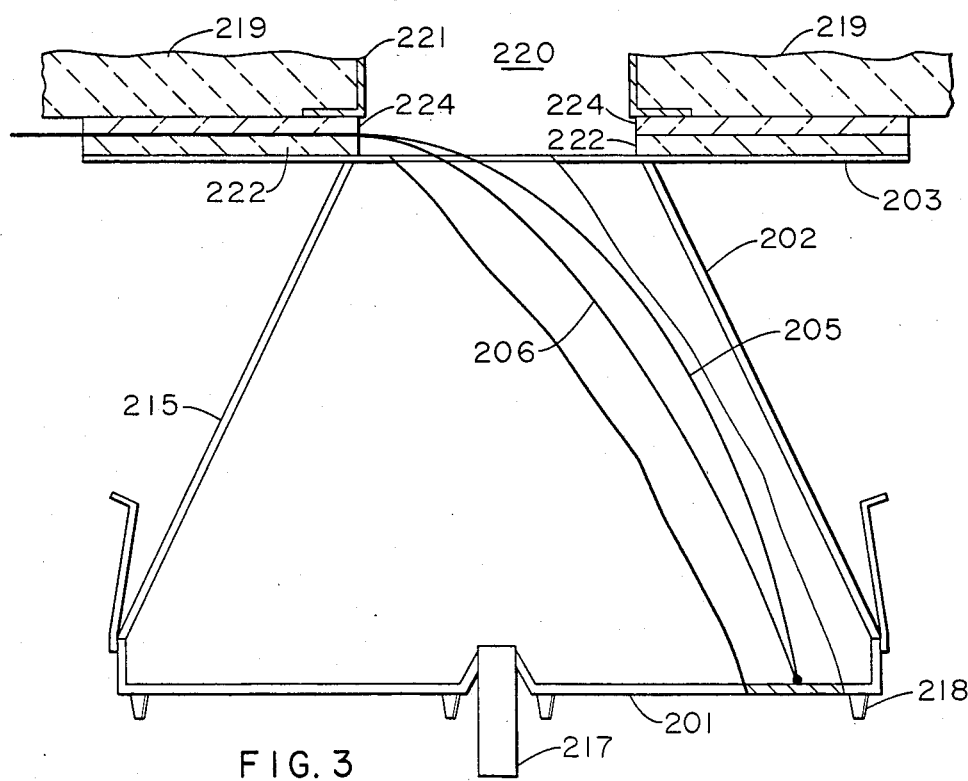
FIG. 3 is an end view of a fiber glass bushing showing the arrangement of the bottom thermocouple used in the embodiment of the instant invention shown in FIG. 2.

Turning to FIGS. 2 and 3, there is shown an illustration of one embodiment of apparatus constructed in accordance with the instant invention that can be used to provide the enhanced measurements and control contemplated by the method of controlling bushing temperatures herein described. Thus, as shown in FIG. 2, a bushing generally indicated at 200 has sidewalls 201 and 215, end walls 213 and 214 and a bottom or orifice plate 201. The orifices are not shown in this figure. The bushing 200 is open at the top and has a flange 203 around the walls and ends at the top for mounting the bushing within the ceramic bushing blocks conventionally employed in the art for mounting the bushing 200 to a forehearth. The bushing 200 is supplied with two thermocouples 207 and 210 which are located in the sidewall 202 of the bushing slightly above the bottom 201. Thermocouple 210 has two thermocouple leads 211 and 212 associated therewith and thermocouple 207 has thermocouple leads 209 and 208 associated therewith. Located in the center of the bushing on the orifice plate 201 is a third thermocouple 204 having lead lines 205 and 206 rising therefrom across the top of the bushing flange 203.

Turning to FIG. 3, which is an end view of a bushing such as that described in FIG. 2, the positioning of the thermocouple 204 with respect to the bottom of the bushing is shown in more detail. Thus, thermocouple 204 has its lead lines 205 and 206 passing upwardly through the bushing to the forehearth opening 220, both leads pass out of the bushing between flange 203 and bushing block 219. Thermocouple wires 205 and 206 are insulated from the bushing block lining 221 and flange 203 of the bushing 200. The thermocouple leads 205 and 206 are thus interposed between the gaskets 222 and 224 which are constructed of a suitable insulating material such as Fiberfrax ®, aluminum oxide cloth, cast ceramics or other similar, highly refractory, non-conducting material that will electrically isolate the bushing flange 203 from the bushing block liner 221 associated with the bushing block 219. Thermocouple leads 205 and 206 are connected outside of the bushing to a temperature averaging device such as 48 (FIG. 1) as are leads 211 and 212 of thermocouple 210 and leads 208 and 209 of the thermocouple 207. The bushing 200 shown in FIG. 3 also shows a bushing ear 217 which is normally connected to the secondary winding of power transformer 22 as shown in FIG. 1. The bushing orifices or nozzles 218 are shown, these being the orifices in the bushing bottom through which molten glass flows to form the fibers. While only two are shown on each half of the bushing depicted, it will be understood by the skilled artisan that there are many of these bushing tips or orifices 218 on a given bushing, a typical quantity ranging from 200 to 4,000 or more.

FIG. 4 shows a bushing similar to that shown in FIG. 2. This bushing generally indicated as 400 is comprised of a bushing flange 403, two end walls 414 and 413, a bottom 401, and sidewalls 415 and 402. In the center of the bushing is a thermocouple junction 404 having two thermocouples leads 405 and 406. At the side 402 of the bushing are two thermocouple junctions 407 and 410. Junction 407 has two thermocouple leads 409 and 408 associated therewith. Thermocouple 410 has two thermocouple leads 411 and 412.

Turning now to FIG. 5, the thermocouple junction 404 is shown embedded in a plate member 404a in which leads 405 and 406 terminate. Leads 405 and 406 are contained within a metal housing 450 and are surrounded in that housing 450 by an insulating material 451 such as cast ceramic or Fiberfrax or other similar electrically inert material. The tube 450 passes through the sidewall 402 of the bushing at opening 453 and the leads 405 and 406 passing from the tube 450 are connected to a temperature averaging device such as shown in FIG. 1.

Also shown in FIG. 5 is the bushing ear 417 to which the bushing is coupled electrically to a transformer for the application of power thereto. FIG. 5 also shows tips or orifices 418 through which molten glass flows to form fibers. In the drawing, four such tips 418 are shown but it will be apparent to the skilled artisan that these tips can vary in number from 200 up to 4,000 or more.

In this embodiment of the invention, the ends of thermocouple leads 405 and 406 are contained in a plate member 404 which is securely welded to the inside of the bottom 401 of the bushing 400. In order to weld this plate firmly to the bottom of the bushing, a small hole 455 is drilled in the bushing bottom 401. A rod-like member 456 is welded to the bottom of plate 404a and the plate 404a is pulled in a downward direction by pulling rod 456 through hole 455, while the plate 404 is held in contact with the bushing bottom 401 by rod 456. The rod is welded to the bushing bottom where its mass is melted and plugs the hole 455.

FIG. 6 shows a cross-section of the tube 450 with the two thermocouple leads 405 and 406 shown contained therein with the ceramic material 451 surrounding both of the leads.

FIG. 7 shows actual measurements taken over a period of time on a bushing which is started up and operated continuously and again shut down and which does not use the instant invention.

FIG. 8 shows the maintenance of an ideal condition using a thermocouple wire on the bushing bottom such as shown in FIGS. 2 and 4 in addition to the side thermocouples. The signals of such thermocouples are averaged and combined resulting in the curve shown in FIG. 8. By operating in this fashion with the placement of the thermocouple on the of the bushing close to the bottom, the Applicant has discovered that the effect of noise can be virtually eliminated and typically is on the order of 0.6% of the signals carried by the thermocouple wires. Typically, in an operation such as that depicted in FIG. 7, this noise level is on the order of 12% or more. Applicant, therefore, is able to record temperatures which are an order of magnitude more accurate than those heretofore possible and feed signals resulting therefrom to bushing controls.

It has been found in accordance with this invention that certain conditions take precedent over others in determining the optimum location of a bottom thermocouple for measuring temperatures and avoiding the interference of noise. It is an important consideration in locating the bottom thermocouple that the thermocouple in relation to its position with respect to any other thermocouple used covers the X and Y axes of a bushing if the length and width are considered the X and Y axes respectively. Thus, looking at FIG. 4 it is found that those temperatures recorded by thermocouples 410 and 407 will approximately represent the temperature of the bushing area running towards the center and down and towards the back of the bushing in the two corners and somewhat toward the ends. By placing the thermocouple 404, however, in the center of the bushing inboard of the backwall 415, the remaining area of the bushing bottom is taken into consideration.

The effects of transients caused by deceleration of a winder, slow downs in filament draw speeds and their effects on the power requirement of the bushing bottom or the effect of start up, and increased air flows, followed by cooling of the bottom of the bushing and the signals resulting therefrom are largely unmeasured by this novel system. Thus, a truer reflection of the actual temperature of the bushing bottom is obtained.

The Applicant has determined this by taking as many as 30 equidistant points of measurement on a tip plate to get a truer average of the tip plate temperatures when compared to temperature conventionally measured using sidewall thermocouples only. In analyzing these measurements, it has been determined that what is read through side wall thermocouples in a bushing is only 88% of the actual bushing tip plate temperature and the remaining 12% represents noise. By placing at least one of the thermocouples on the bottom of the bushing plate as shown herein where two thermocouples are used on the sides to measure the tip plate temperature, it has been found that this noise can be reduced significantly. The spacial relationship of thermocouples is normally placed on the bushings so that they span the X and Y axes as they are shown to do so in FIG. 4. It is important that at least 1 of the thermocouples utilized to measure the surface temperature of the bushing be away from the wall and that one be at least near a wall.

In general, any third thermocouple used in combination with side thermocouples will give a better representation of the average tip plate temperature than the side thermocouples do alone. It is within the contemplation of the instant invention that, in lieu of the thermocouple arrangement shown in FIG. 4, the thermocouples 410 and 407 rather than being located on the side could be located on the bottom of the bushing. In such a case, preferably one is located in the near corner at the bottom and the other in the far corner at the bottom. The important consideration is to have the thermocouples span the X and Y axes as stated heretofore. While the bushings shown in the drawings have a generally rectangular configuration, it will also be understood by the skilled artisan that the same control can be applied to bushings of circular configuration. In such a case, the ideal situation would be to locate a thermocouple in the center of the circle and two on opposite sides along the diameter line. Modifications off the diameter would still be permitted provided that sufficient surface area of the circle was encompassed by the thermocouple locations. Thus, the important consideration is that the third signal responding thermocouple be placed with respect to the other two in such a manner that the noise effect of the measured temperatures normally recorded by the first two thermocouples is reduced to less than 6% of those measured temperatures.

While the invention has been described with reference to certain specific examples and illustrated embodiments it will be understood that it is not intended to be limited thereby except insofar as appears in the accompanying claims.

I claim:

1. Method of controlling the temperature of a glass fiber forming bushing having a fiber forming surface which has an electrical control connected thereto responsive to signals generated by measured temperatures of said bushing comprising: measuring the temperature of the bushing in at least one location on a surface adjacent to and above the fiber forming surface to provide a signal representing the bushing surface temperature over a given area, measuring the bushing temperature in a location on the fiber forming surface thereof so positioned that when that temperature measurement is combined with the first stated measurement and averaged therewith, the resulting average temperature of the bushing is obtained with the noise effect of the first measured temperature being reduced to less than 6%.

2. The method of controlling the temperature of a glass fiber forming bushing which has an electrical control connected thereto responsive to signals generated by measured temperatures of said bushing comprising: measuring the temperature of the bushing in at least two locations on a first surface of the bushing to provide a signal representing the bushing surface temperature over a given area, measuring the bushing temperature in a third location adjacent to but above said first surface and so positioned thereon that when that temperature measurement is combined with the measurement of the first two and averaged therewith, an average temperature of the bushing is obtained with the noise effect of the measured temperatures of the first two measurements being reduced to less than 6%.

3. The method of claim 2, wherein the averaged temperature after the third temperature is averaged with the first two has the noise effect of the first two measured temperatures reduced to less than 0.6%.

4. In a bushing for forming glass fibers having a floor and side walls and wherein the operating temperature thereof is continuously controlled by a temperature controller connected thereto, means to measure the temperature of the bushing in at least one location positioned on a side wall thereof adjacent to but above the floor thereof, at least one means to measure temperature positioned near the second side wall of said bushing but positioned on the floor, means to feed the signals resulting from measuring the temperatures of the bushing from said temperature measuring means to a means capable of combining the signals and weight averaging these signals to produce a signal, means to feed the signal so produced to the bushing controller to thereby control the temperature of the bushing to a desired value.

5. In a bushing for forming glass fibers having a floor and side walls and wherein the operating temperature of the bushing is continuously controlled by a temperature controller connected to the bushing, the improvement comprising:

means to measure the temperatures of the bushing in at least two locations positioned on a side wall of the bushing and adjacent to the floor thereof, at least one other means to measure the temperature of the bushing positioned near a second side wall of the bushing but positioned on the floor thereof, means to feed the signals resulting from measuring the temperatures of the bushing from said temperature measuring means to a means capable of combining the signals and weight averaging them to produce a signal, means to feed the signal so produced to the bushing controller to thereby control the temperature of the bushing to a selected value.

6. The apparatus of claim 5, wherein the temperature measuring means is a thermocouple and the thermocouple on the floor of the bushing is contained within a precious metal tube having ceramic surrounding the thermocouple wires and the thermocouple juncture is embedded in a metallic plate welded to the floor of the bushing.

7. A bushing including means for measuring temperatures of the bushing bottom comprising, a container for molten glass having a flange around the periphery thereof, a bushing block having a lining thereon in contact with said flange, thermocouple junctions welded to the sides of the bushing at either end thereof, a thermocouple wire junction embedded in the bottom of the bushing and having its lead wires extending over the bushing flange, means to insulate the said lead wires between the said flange and the lining of the bushing block and means to connect the thermocouple lead wires to the same temperature controller to which the thermocouple wires of the sidewall thermocouples are fed.

* * * * *